(12) United States Patent
Livermore et al.

(10) Patent No.: US 6,542,511 B1
(45) Date of Patent: Apr. 1, 2003

(54) PROGRAMMABLE TRANSPORT AND NETWORK ARCHITECTURE

(75) Inventors: Frederick C. Livermore, Stittsville (CA); Richard P. Skillen, Mississauga (CA); Maged E. Beshai, Stittsville (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/116,477

(22) Filed: Jul. 16, 1998

(30) Foreign Application Priority Data

Apr. 30, 1998 (CA) ............................................. 2236394

(51) Int. Cl.[7] .......................... H04L 12/28; H04L 12/56
(52) U.S. Cl. ...................................... 370/406; 370/258
(58) Field of Search .............................. 370/400, 406, 370/424, 232, 252, 254, 258, 389; 395/220, 238, 251

(56) References Cited

U.S. PATENT DOCUMENTS

| | | | |
|---|---|---|---|
| 4,494,229 A | * | 1/1985 | Jolissaint .................... 370/58 |
| 4,587,651 A | * | 5/1986 | Nelson et al. ................ 370/88 |
| 4,866,704 A | * | 9/1989 | Bergman .................... 370/85.4 |
| 5,043,981 A | * | 8/1991 | Firoozmand et al. ...... 370/85.1 |
| 5,206,857 A | * | 4/1993 | Farleigh .................... 370/85.5 |
| 5,802,043 A | * | 9/1998 | Skillen et al. ............... 370/258 |
| 6,088,331 A | * | 7/2000 | Beshai et al. ................ 370/232 |

* cited by examiner

*Primary Examiner*—Alpus H. Hsu
*Assistant Examiner*—Toan D. Nguyen

(57) ABSTRACT

This invention relates to the design of a scaleable high performance multiservice network based on programmable transport. A meshed network with dynamically-adjustable link capacities and nodes which provide data packing into "containers" for transport is proposed. A ring-based network, exchanging data containers among its nodes, is the preferred implementation, due to its flexibility, maintainability, and high reliability. With lossless rings, the quality of service is controlled solely by the origin and destination nodes, without any interference from other data streams. Flexible programmable transport greatly improves the performance, simplifies the controls, and facilitates scaleability. The concept is a departure from classical network thinking. By reducing the complexity of the network core, an economical, reliable, and manageable network with feature-rich edge nodes can be realized. An architecture with recursive ring-based structures provides a high degree of flexibility in bandwidth allocation and is compatible with current transport networks and future all-optical networks.

18 Claims, 10 Drawing Sheets

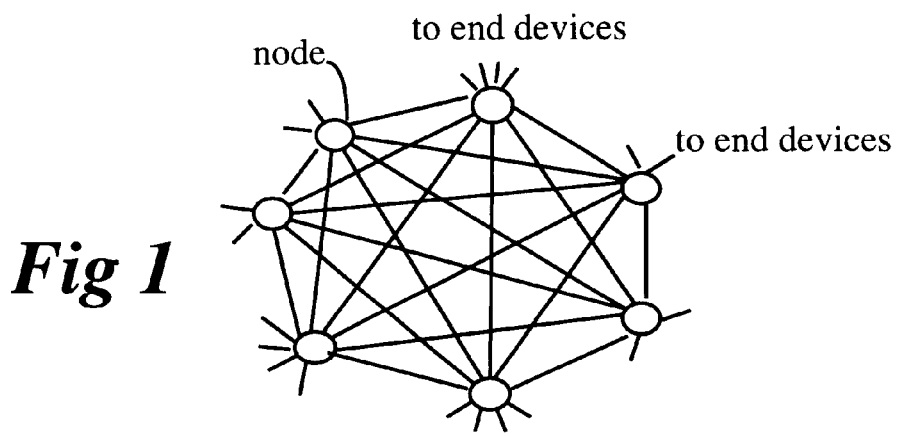
*Fig 1*
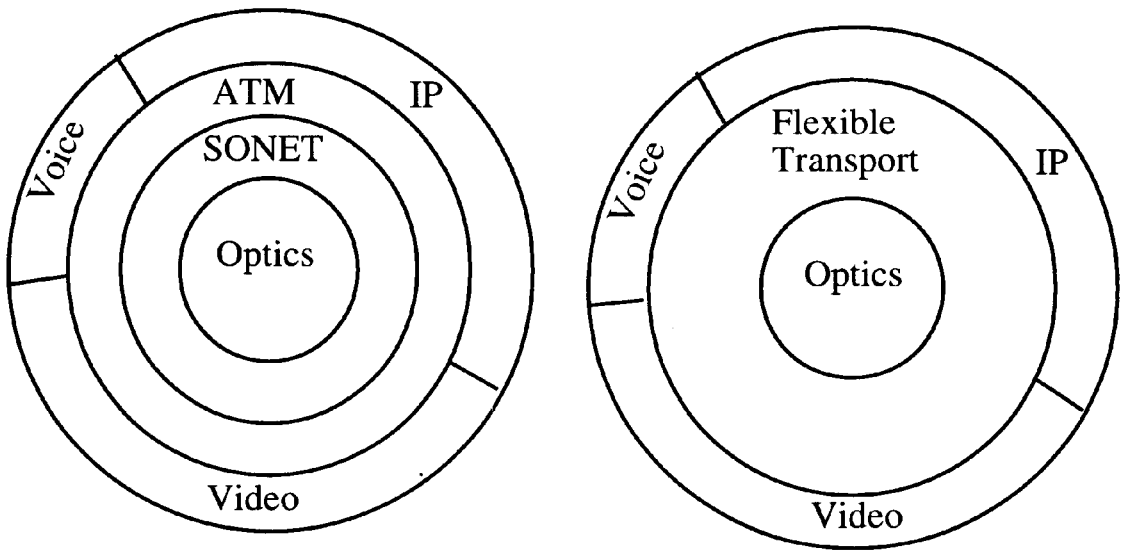
*Fig 2*          *Fig 3*
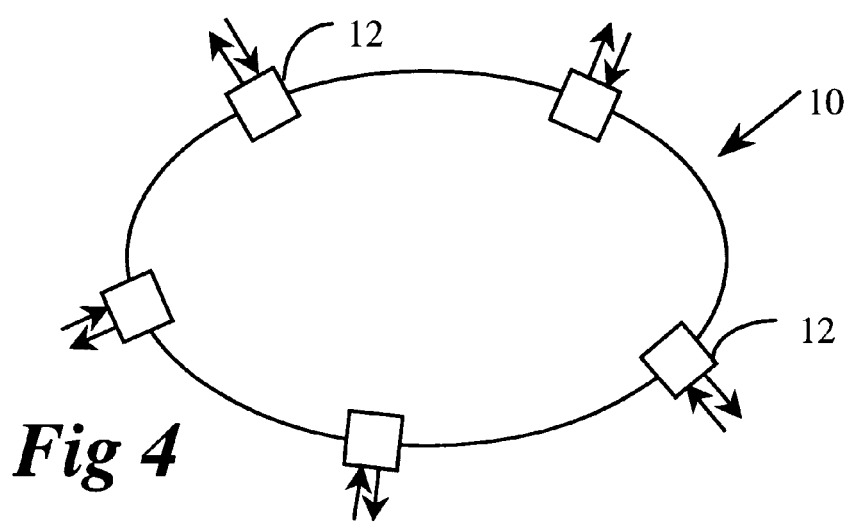
*Fig 4*

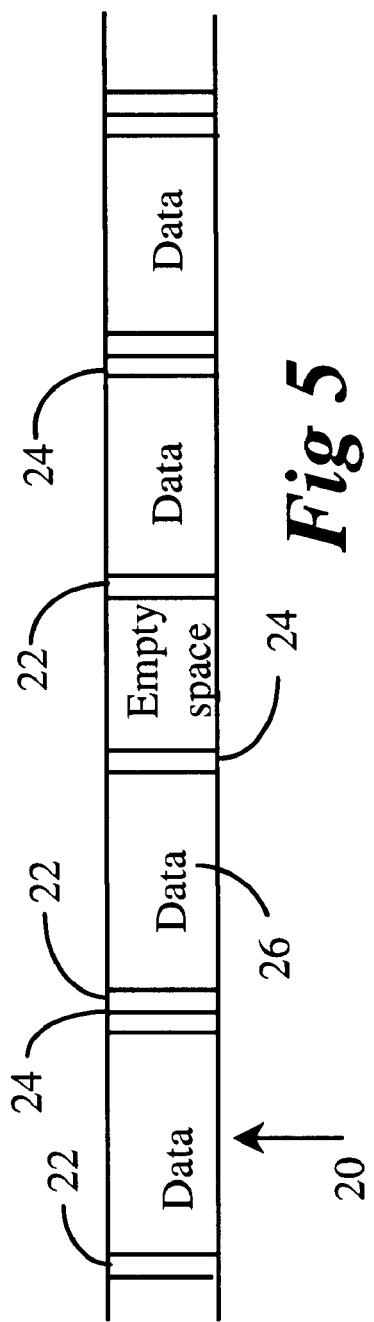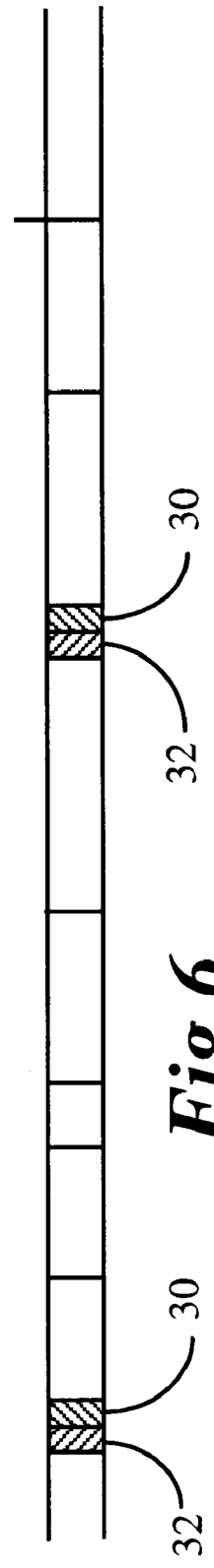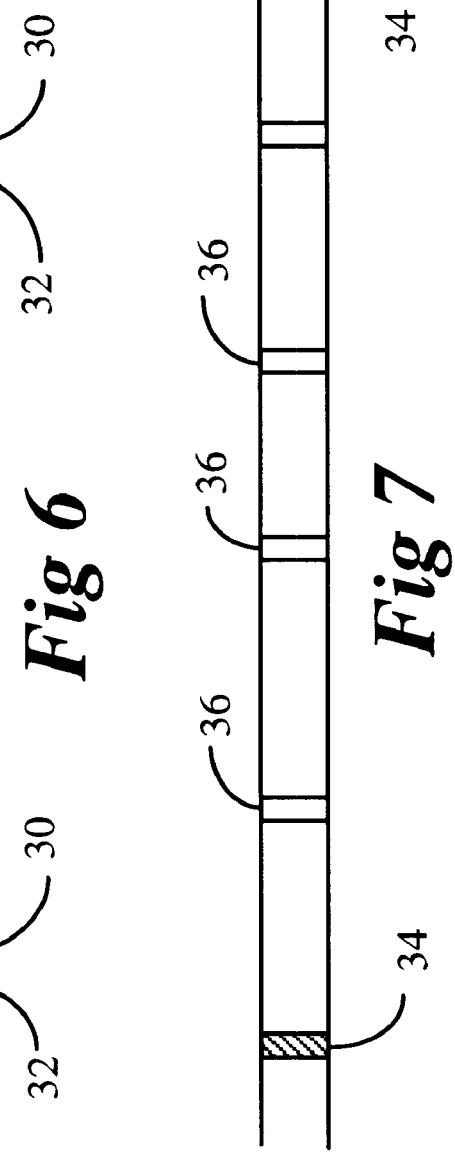

M = 256, L = 4096, R = 10 Gb/s, T = 105 μsec

Outgoing-container allocation: node 0
(Successive entries are separated by n slots in the frame.)

PROGRAMMABLE TRANSPORT AND NETWORK ARCHITECTURE

FIELD OF THE INVENTION

This invention relates generally to efficient transfer of digital information among nodes. In particular, it is directed to a novel digital network in which digital information is exchanged among nodes in containers of any number of data units.

BACKGROUND OF INVENTION

To date, communication networks have been primarily used for voice services and support limited data and computer services. In recognition of the predominance of voice traffic, a circuit switched channelized architecture evolved and was optimized for telephony. Data and computer communications access and transport have been provided as an overlay on this channelized infrastructure.

Although many data technologies have been developed, the advent and subsequent popularity of the Internet, coupled with its ability to support multiple services, including telephony, is changing the way users communicate and do business. Today, telecommunications networks are shifting from specialized networks toward multipurpose multifunctional networks.

The emerging data network must be able to grow to a much-higher capacity than the capacity of today's voice and data networks. In addition to the huge-capacity requirement, the emerging networks must provide diverse and versatile services. The multiplicity of connection protocols, and the effort required for their interworking, inhibit the ability of the network to provide service diversity. The simplest network would be fully connected, allowing every networking device to have a physical connection to every other networking device. However, as the network size grows, this fully-meshed structure rapidly becomes impractical. Due to the spatial variation of traffic loads, and the typically large modular sizes of transport links, a fully-meshed network normally leads to underutilized transport facilities.

Currently, transport-capacity sharing is based on coarse-granularity, where point-to-point connections are defined as multiples of standard tributaries, such as OC3, OC12, etc. This renders tandem switching—at a lower granularity—necessary to establish end-to-end connections with an acceptable quality-of-service (QOS) and an acceptable overall network efficiency. A low-connectivity network with excessive tandem switching may however lead to an uneconomical network, due to the increased number of hops between origin and destination and the cost of processing in intermediate nodes. Tandem switching in the multi-protocol environment is rather complicated, and several techniques have been proposed to reduce the processing at intermediate nodes by creating "short-cuts", see for example, an article in IEEE INFOCOM, 1996, pp. 1251–1260, "Flow—Labelled IP: A Connectionless Approach to ATM" by P. Newman et al. In addition, tandem switching adds variable delay and increases latency.

The multiplicity of communications protocols and the need for coexistence between new networks and legacy networks complicate the network planning function. In addition, QOS is difficult to realize in such a heterogeneous network. Currently, IP-based networks do not take the QOS into account, and one of the approaches to provide QOS assurance is to interwork—at a prohibitive cost—with an underlying switch-based network, such as ATM networks. The complexity and fragility of such approaches are formidable impediments to network scaleability.

Traditional transport systems can offer a meshed network by providing direct interconnections between the networking devices. However, the connections would be based on channelized time division multiplexing, where the bandwidth allocated to a node-pair is fixed and dedicated to the node-pair. When the connection between two devices is inactive for some period of time, the transport bandwidth is still reserved so that it cannot be utilized by other active connections. Thus the networking device interfaces may not be as efficiently utilized as in the tandem approach which allows interconnections from many networking devices to share the interface to a given device.

U.S. Pat. No. 5,293,376, issued Mar. 8, 1994 (White), describes an upgradable telecommunication network which comprises a plurality of interconnected nodes or central offices, such as a SONET ring network. In its network, a unique controller enables a subscriber to change the central office or node in the network to which it is connected without changing the telephone number of the subscriber location.

U.S. Pat. No. 5,247,518, issued Sep. 21, 1993 (Takiyasu et al), teaches a high speed ring LAN system in which SONET subframes flow in a time-divisional n-multiplexed format. The respective node devices inserted in the transmission path have one or more ports to accommodate sub-LANs or public networks. Information is exchanged in units of a fixed-length container (packet) between a received SONET subframe and an asynchronous port, whereas information is exchanged in units of a byte between the SONET subframe and a synchronous port.

U.S. Pat. No. 5,406,401, issued Apr. 11, 1995 (Kremer) describes a technique of selective tributary switching in a bi-directional ring transmission system. The patent describes how selective switching in a bi-directional transmission system is used to realize selective tributary switching. A portion of bandwidth of a link that has been provisioned to be line-switched is governed by the set-up and take down procedures of full line-switching. The remaining bandwidth can be left unprotected but can be path-switched, because the line-switching functionality is combined with path-switching functionality in the same ring transmission system.

A fully-meshed network, as depicted in FIG. 1, is not scaleable to cover a large number of nodes, unless the link capacities are elastic and can be modified rapidly to follow the traffic-demand variation. With fixed capacities and fluctuating traffic demand, the transport utilization drops rapidly as the number of nodes increases. An elastic network, however, would allow all the connections to share a common pool of capacity through paths whose capacities are dynamically adjustable.

The envisaged network to be described herein has a high-connectivity structure. The basic requirements of such a network are simplicity, scale—ability, transport efficiency, the ability to accommodate existing legacy subnetworks, and—most importantly—high reliability. There are several candidate topologies which, primarily, fall into two main categories: cross-connection and ring sharing.

Both cross-connection-based and ring-based networks can be configured to be fully meshed or almost fully meshed. A cross-connection-based network would normally have a lower connectivity than a ring-based network and is not discussed in this disclosure. A ring structure lends itself to fine capacity partitioning with relatively simple controls.

Ring sharing can be achieved in several ways; for example by using ATM nodes and SONET rings, as depicted in FIG. 2. However, a flexible-transport layer as shown in FIG. 3 would achieve a more economical solution. A path of controlled variable capacity for each node pair is established in the network, thus creating a flexible fully-connected network. Each path may carry multiple traffic classes, and the capacity of the path can be dynamically shared among the classes at the container-packing stage. The network can accommodate a mixture of data, voice, and video traffic of both unicast and multicast nature. The multiclass service discipline is decided only at the originating and terminating nodes.

A pending U.S. patent application Ser. No. 08/755,431 filed on Nov. 21, 1996 for "Transport Architecture and Network Elements" has inventors common to those of the present application and describes a ring structure with capacity partitioning. The invention described therein allows many networking devices to be interconnected with efficiently utilized interfaces, without incurring the cost and service degradation of a tandem device. A domain is defined where every networking device within the domain is connected to every other networking device within it with fixed or variable capacity. All the connections within the domain share a common pool of capacity, maximizing the utilization of the device interfaces. Since this new function is integrated into the transport network, the cost and service degradation associated with tandem networking devices is avoided. Various networking devices which use different protocols, such as ATM or IP, are accommodated by defining a container structure which carries digital information in its native form between them. The containers are carried on a digital facility with a defined bit rate that circulates on a ring or virtual ring past every networking device in the domain.

The present invention extends the concept of the meshed networking based on a ring configuration described in the above referenced patent application. The meshed network of the invention allows all the connections to share a common pool of capacity through links among nodes whose capacities are dynamically adjustable. Like the invention of the patent application referred to above, nodes provide data packaging into "containers" for transport and a ring exchanges data containers among its nodes but in the present invention, the containers may be of fixed or variable sizes. The invention calls for a service rate calculation for each source-destination node pair which is carried out by a centralized or distributed controller. Such controller either monitors the traffic or receives updated capacity-allocation requests from the nodes, and assigns an appropriate data rate at which each node can transmit to each destination. With lossless rings (traffic-wise), the quality of service is controlled solely by the source and destination nodes, without any interference from other data streams within the network. By reducing the complexity of the network core, an economical, reliable, and manageable network with feature-rich edge nodes can be realized.

In summary, a flexible programmable transport simplifies network management and extends the network capacity and network coverage by letting the end nodes control the QOS and end-to-end capacity allocation. Rather than forcing the network to cope with multiple protocols, node-pairs can communicate directly through adaptive end-to-end links. Thus, interoperability is replaced by protocol disengagement. The flexible capacity allocation can be realized in frame-based or container-based schemes. This technique is particularly attractive because of its inherent compatibility with the North-American fiber-network topology.

Other U. S. pending patent applications Ser. No. 08/834, 974 filed on Apr. 7, 1997 for "Parallel Service-Rate Controllers in ATM Switches", Serial No. 08/827,882 filed on Apr. 7, 1997 for "Large-scale Serial Service Rate Regulators for ATM Switching" and Ser. No. 08/985,297 filed on Dec. 4, 1997 for "ATM Service Scheduler using Reverse-Binary Scattering and Time-space Mapping" all have an inventor common to the present application. These pending applications describe in detail the rate controlling and scheduling techniques of a shared medium which are applicable to the present invention.

Objects of the Invention

It is an object of the invention to provide a flexible programmable transport network which realizes a fully meshed configuration, simple network management and easy capacity scaleability and yet which is compatible with current transport networks and possibly with future all-optical networks.

It is a further object of the invention to provide a fully meshed network in which the end nodes in each pair control the QOS of the traffic between them according to end-to-end capacity allocations.

It is yet another object of the invention to provide a ring network in which, node-pairs can communicate directly through adaptive end-to-end links whose capacity is dynamically adjustable.

It is still an object of the invention to provide a fully meshed network in which traffic is exchanged among the nodes in containers of any desired number of data units.

It is an additional object of the invention to provide a fully meshed network in a ring configuration in which container scheduling is provided, sharing bandwidth at the topological level.

It is a further object of the invention to provide a fully meshed network in ring configuration in which centralized control and distributed control schemes can coexist.

SUMMARY OF THE INVENTION

Briefly stated, in accordance with one aspect, the invention is directed to a communication network for transporting digital traffic among a plurality of nodes in a fully meshed logical configuration. The network comprises a dual transport ring for transporting digital traffic in opposite directions, the digital traffic consisting of containers of digital signal, each container containing any number of data units and being destined to one or more nodes among the plurality of nodes. The network further includes the plurality of nodes located on the dual transport ring, each node extracting from the dual transport ring containers destined to it and inserting thereto containers destined to any of the remaining nodes and each node controlling a rate at which it inserts to the dual transport ring the amount of data in the containers destined to any of the remaining nodes.

According to another aspect, the invention is directed to a node in a communications network which transports digital traffic among a plurality of nodes via a dual transport ring in a fully meshed logical configuration, the digital traffic consisting of containers of any number of data units. The node comprises two ring buffers for storing traffic in the dual transport ring coming into the node and an add buffer for storing containers to be inserted into the dual transport ring. The node further includes a drop buffer for storing containers extracted at the node from the dual transport ring and a rate scheduler for scheduling insertion of containers into the dual transport ring in accordance with an allowed rate approved by the communication network.

In accordance with another aspect, the invention is directed to a method of transporting digital traffic among a plurality of nodes located on a dual transport ring in a fully meshed logical configuration. The method comprises steps of storing a plurality of data streams in a plurality of add buffers according to their destinations and acquiring an allowed data rate at which each data stream is to be inserted to the dual transport ring. The method further includes steps of extracting a properly addressed data stream from the dual transport ring, storing it in a drop buffer and inserting a plurality of data streams into the dual transport ring at locations properly assigned to their destinations.

In accordance with a yet another aspect, the invention is directed to a method of scheduling digital data at a node in a telecommunications network in which the network is formed by a ring transport medium having a plurality of nodes and the digital data comprises a plurality of data streams. The method comprises steps of storing the plurality of data streams respectively in a plurality of storage locations and calculating a parameter indicative of an accumulated rate of the data streams stored in each storage location. The method includes further steps of declaring each data stream eligible for transport when the parameter exceeds an allowed data rate of said data stream and transporting into the ring transport medium each eligible data stream in accordance with a predetermined criterion.

BRIEF DESCRIPTION OF THE DRAWINGS

FIG. 1 shows a fully meshed network.

FIG. 2 depicts an existing network architecture.

FIG. 3 is a conceptual view of novel network architecture according to the present invention.

FIG. 4 shows a fully meshed network according to the present invention.

FIG. 5 is the structure of a data stream according to one embodiment of the invention.

FIGS. 6 and 7 are structures of data streams according to further embodiments of the invention.

DETAILED DESCRIPTION OF PREFERRED EMBODIMENTS OF THE INVENTION

Figure 8:
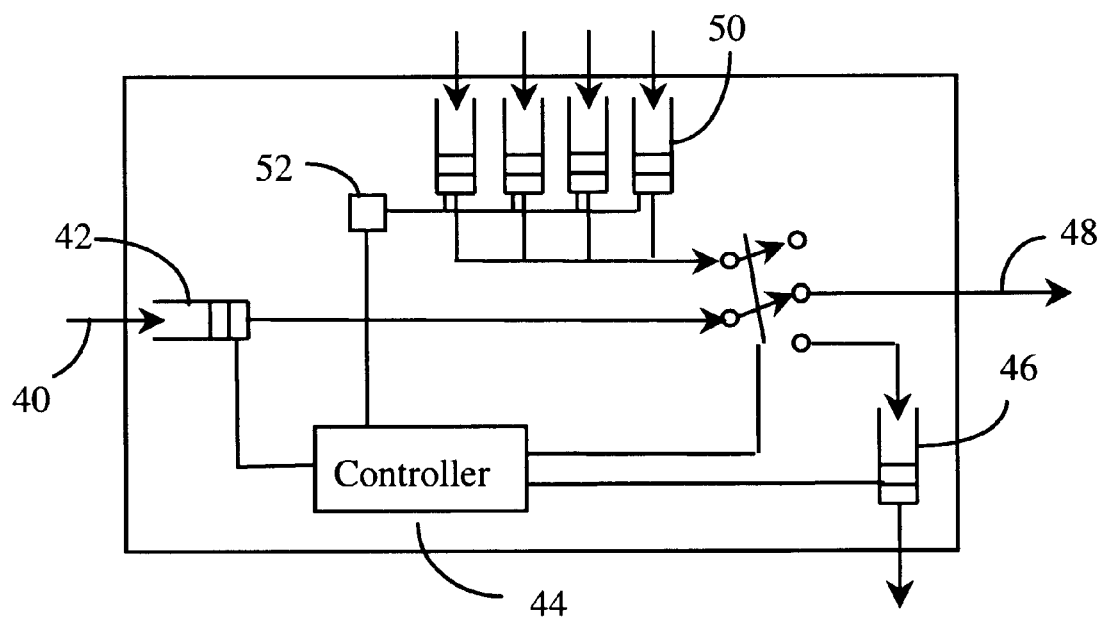
FIG. 8 shows schematically the construction of a node handling traffic in one direction according to an embodiment of the invention.

FIG. 4 shows a basic configuration of a transport network according to the invention. Referring to the Figure, in the network 10, data is exchanged among nodes 12, e.g., five nodes, in fully meshed connectivity. The transport media in this description are rings and they are, in particular though not limited to, fiber optic rings. As mentioned earlier, the domain is a digital facility with a defined bit rate consisting of a continuous series of digital data units and there can be more than one domain on the same level or different levels of hierarchy. The data units can be any arbitrary preset unit, e.g., a byte, and data is transferred in containers of any desired number of data units. Each node in the network is a simple container packing and unpacking device. Each node is assigned a number of containers to carry its data to other nodes in the ring. The set of containers available to all nodes may form a frame. The frame size is arbitrary and is governed by granularity or data-delay specifications. The containers belonging to a given originating node are said to form a subframe, i.e., a frame contains a subframe for each originating node.

FIG. 5 illustrates one example of a signal structure 20 made up of a series of containers, each of which contains a header 22, a trailer 24 and payload data 26. The header and the tail have fixed numbers of data units which contain predetermined signal patterns to identify themselves. The header also includes an indication (address) of a destination node and the length of its container (the number of data units for example) They may include other fields for other purposes which may be desired. Other container and frame structures are possible and just two such structures are shown in FIGS. 6 and 7. In FIG. 6, the signal stream is formed into a series of frames which are made of a variable number of containers. Each frame includes a header 30 and maybe a trailer 32 in some cases. Within a frame, containers are provided for each source node to insert any allowed number of data units destined to any of the destination nodes. In FIG. 7, there are frame headers 34 and container headers 36. Each container header 36 identifies its destination node. The train of containers from a given source to a destination node is naturally concatenated at the destination node. Therefore, the container-packing process need not be aware of the data format and it need not limit the content of a container to an integer number of data transaction units, such as ATM cells, IP packets, or "circuit-switched" data blocks.

For simplicity of explanation and in aid of understanding the operation, however, either or both the container size and the frame size are fixed in some of the embodiments of the invention.

At least two control schemes are possible: one being based on processing a frame header, and the other on processing the headers of the individual containers. In the first, a node identifies the locations of its receivable payload from the information in the frame header. In the second scheme, each node reads the labels of all containers but copies only the relevant data. Some containers may be multicast containers. A multicast container is inserted once per ring but may be read by each node in the ring. The container duration is determined by the container size and the ring speed. With an OC192 (10 Gb/s) ring, for example, a 4096-bit container consumes 0.41 microseconds. A container's share of the ring capacity is the reciprocal of the number of containers per frame. Generally, a large number of containers per frame results in a better resolution at the expense of a higher delay. A frame of 1000 containers, of 4096 bits capacity each, has a period of 410 microseconds in an OC192 (10 Gb/s) ring, with each container representing 1/1000 of the ring rate; 10 Mb/s in the OC192 case. Increasing the size of the frame to 10000 containers increases the frame period to 4.1 milliseconds and each container represents a capacity unit of 1 Mb/s. A large frame period, however, is undesirable, and with appropriate container scheduling, it is possible to realize a very high resolution using relatively short frames.

Referring back to FIG. 4, each node in the network is a simple container packing and unpacking device which inserts or removes a container to/from the signal stream traveling in the ring. According to one embodiment, one of the nodes within the domain generates and allocates the multiplex containers, and indicates the length and alignment of each multiplex container by generating a multiplex container label (identifier). This node is referred to as the domain controller node. Other domain nodes can assume this responsibility in the event of failure of the original domain controller. The domain controller node monitors the condition of the ring and calculates rates to be given to each node pair. The domain controller node communicates from time to time with all the nodes in a domain or domains by special controller containers informing each node topological information of the domain or domains, e.g., routing information between any node pairs, and a maximum number of data units in a container the node is allowed to transfer from one specific node to another on the ring. The allocation can be changed from time to time or from one container to the next using a simple rate controller which facilitates precise rate allocation for each node pair. The domain controller node facilitates precise rate allocation for each node pair.

FIG. 8 is a functional schematic illustration of a node in one direction of a dual ring. The node of course includes the same arrangement for traffic propagating in the opposite direction. A signal stream 40 in the ring is buffered at a ring buffer 42. A node controller 44 monitors the header/tail and decides to send the container to a drop buffer 46 or to an output port 48 to the next node on the ring. The node controller 44 diverts to its drop buffer only those containers addressed to it and passes all other containers on to the next node. While the container is being diverted to the drop buffer, a container stored in an add buffer 50 is being inserted to the outgoing channel. The add buffer 50 in fact has a plurality of queues for a plurality of classes or a plurality of destinations or both. The traffic being inserted is separately stored in a separate queue and a scheduler 52 (queue controller) enables one queue at a time for inserting a container therefrom. The container being inserted is addressed to another node and the amount of data units that can be inserted is either governed by the rate allocated by the domain controller node or determined according to a distributed rate allocation scheme. The container being added is not necessarily in the same size as the container being dropped. In fact, they may be most of the time different from one another. If the container being added is properly rate controlled but is larger than the container being diverted, the signal stream is stored in the ring buffer to create a sufficient space for the container being added.

The above referenced applicant's pending applications Ser. Nos. 08/834,974, 08/827,882 and 08/985,297 describe the rate control techniques of a shared medium. These techniques can be effectively used in the present invention. The applications explain that the generic problem of service rate control may be stated as follows:

A link of fixed capacity is shared by a number of traffic streams which are allocated separate queues. The streams may share the link according to one of many policies, such as a fixed rate per stream, or a guaranteed minimum rate per stream. In any of these policies, the maximum number of cells that a queue may transfer to the link in a single transaction (i.e., in a contiguous period) may be limited to a predetermined bound. Two rate control disciplines, are described in detail, the first being the fixed service rate per class, and the second the guaranteed minimum service rate per class. The former applies to delay-sensitive traffic and the latter applies to delay-tolerant traffic.

While the techniques described above uses the ATM cell as the basic data unit, it should of course be noted that any fixed units can be used for the above rate controlling techniques.

Within the fixed service rate per class controls, two equivalent mechanisms are possible; controlling the sampling rate per class or controlling the sampling interval per class. While these two options of frequency and time domain controls are functionally equivalent, the hardware implementations can differ substantially. The frequency domain control schemes are suitable for a small or medium number of classes. For a large number of classes, several hundreds for example, time-space mapping associated with time domain control schemes are preferable. The above referenced pending patent applications describe these mechanisms in detail. In the pending application Ser. No. 08/985, 297, in particular, a technique of scheduling multiple streams of ATM traffic from a node is described. The technique calls for a link controller which scans a time-space map to determine when a given stream will be sampled and its cells transmitted from the memory out over a link. The time-space map comprises time-slots whose spatial positions within the map correspond to times at which cell can be transmitted.

Therefore, the node controller 44 shown in FIG. 8 may be provided with service rate controller which governs the operations of the scheduler 52 and add buffer 50. As mentioned above, the service rate controller may be of the type of either the frequency domain control or the time domain control.

Ring Capacity

Figure 9:
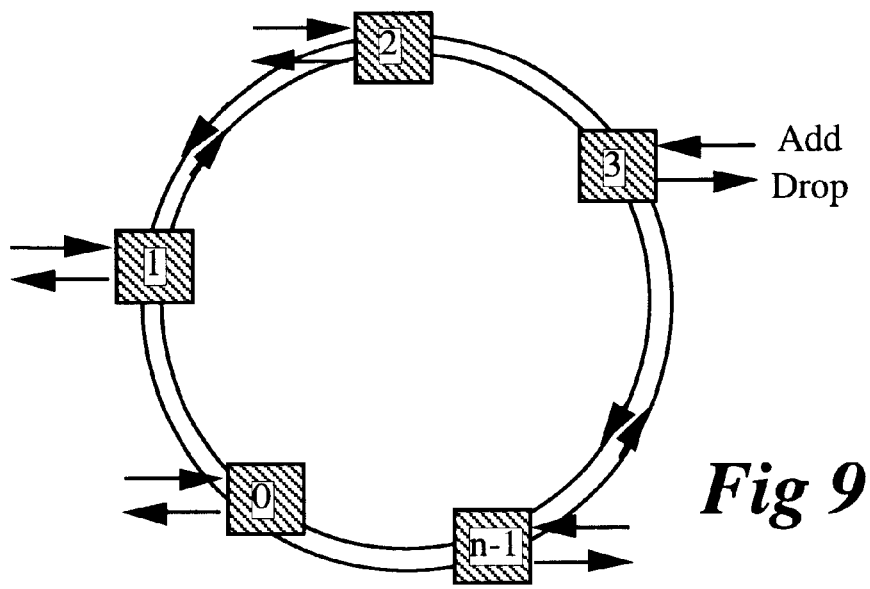
FIG. 9 depicts a dual ring configuration of a domain.

A single-channel ring constitutes a basic control domain. A basic ring interconnects a number of add-drop multiplexers which share a single unidirectional channel. Generally, the term channel is used to indicate a tributary or an entire wavelength in a single fiber. In this specification, the term refers to a wavelength. The total capacity per channel in a ring of n nodes, i.e., the maximum carried traffic by the channel, depends on the capacity R of the channel (e.g., 10 Gb/s) and the spatial distribution of the traffic demand (the traffic distribution among the end nodes). Assuming a uniform distribution of the spatial traffic demand the capacity limit of a unidirectional ring is C=2R. Using a ring pair, comprising a clockwise ring and a counter-clockwise ring, as shown in FIG. 9, routes with more than n/2 hops can be avoided, and the capacity C per channel increases to: C=4nR/(n+1), if n is odd, or C=4(n−1)R/n, if n is even, under the same assumptions of spatially-balanced traffic demand. Thus, the capacity of a dual ring is almost double the capacity of two unidirectional identical rings. Using dual rings enhances the capacity per wavelength by a factor of approximately two.

Figure 10:
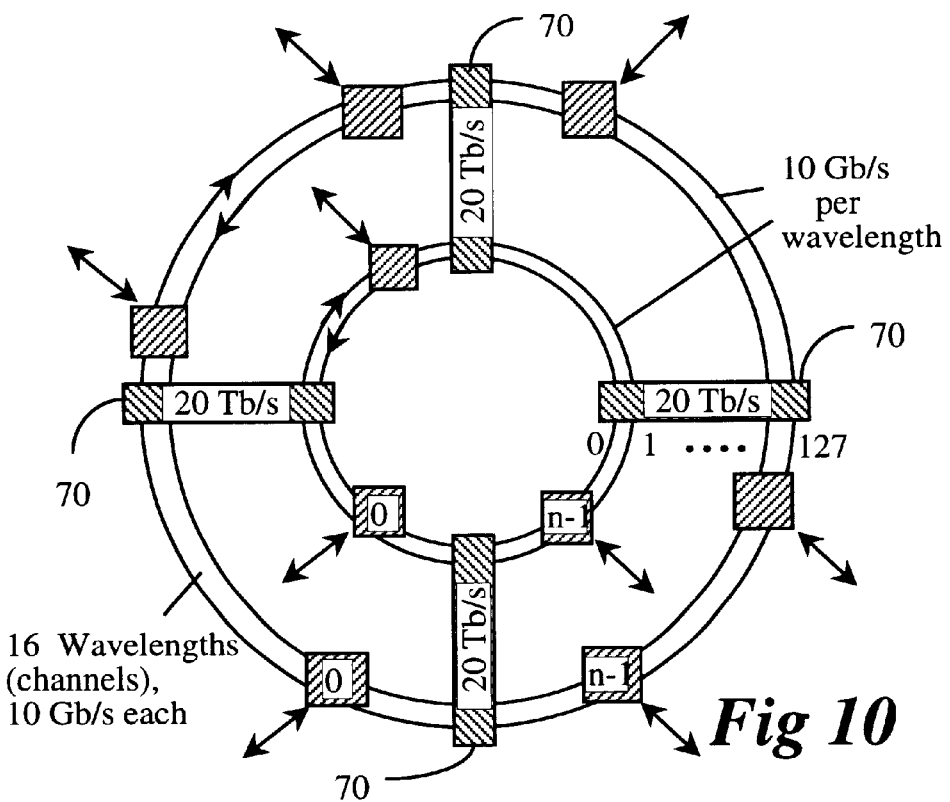
FIG. 10 shows a domain according to one embodiment of the invention having 80Tb/s capacity.

To realize a ring (domain) capacity of the order of tens of Tb/s (Terabits/sec), it is necessary to use multiple fibers each supporting multiple wavelengths. FIG. 10 illustrates such an arrangement. The channels of a domain must be interconnected at least at one point. Using M fibers, each supporting W wavelengths, i.e., MW channels, at a bit rate of R Gb/s per channel, yields a total capacity of more than RMW b/s. The MW channels must exchange payload data through one or more container switches. For example, with M=128, W=16, and R=10 Gb/s, container switches of 20 Tb/s capacity each would be needed. The domain of FIG. 10 has 128 fiber rings, each supporting 16 wavelengths, with 10 Gb/s per wavelength. Four interconnecting container switches 70, topologically evenly spaced, are used. The domain capacity is not a linear function of the number of container switches, and it is sufficient to use four container switches per domain, each interconnecting all the channels of the domain, to realize almost the maximum attainable capacity for a given set of single rings. In the domain of FIG. 10, the maximum capacity is about 80 Tb/s (only by coincidence this equals the sum of the capacities of the container switches). It is noted that using more than four 20 Tb/s switches results in an insignificant increase in the overall capacity.

Figure 11:
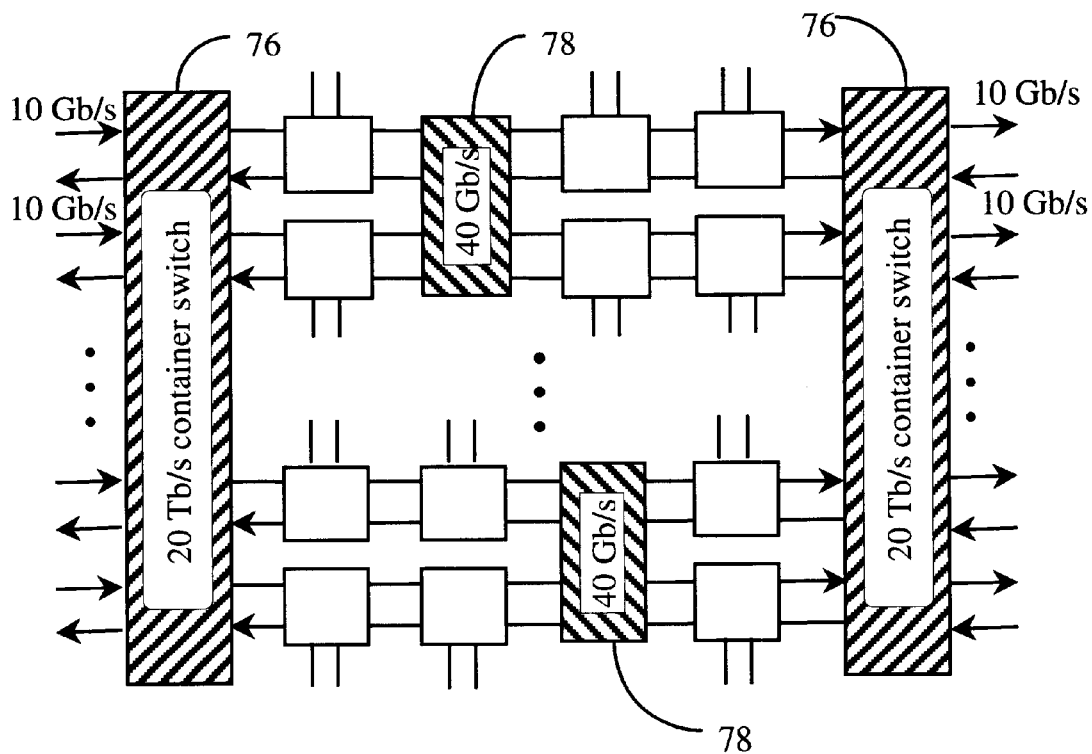
FIG. 11 shows an expanded illustration of nodes and container switches.

It may also be desirable to partially connect some of the rings, using intermediate-capacity container switches, in order to shorten some end-to-end paths as shown in FIG. 11. The channels are arranged in dual pairs (clockwise/counter clockwise). The figure illustrates the inter-connection of all the rings by 20 Tb/s switches 76, and also shows smaller container switches 78 interconnecting dual rings.

Figure 12:
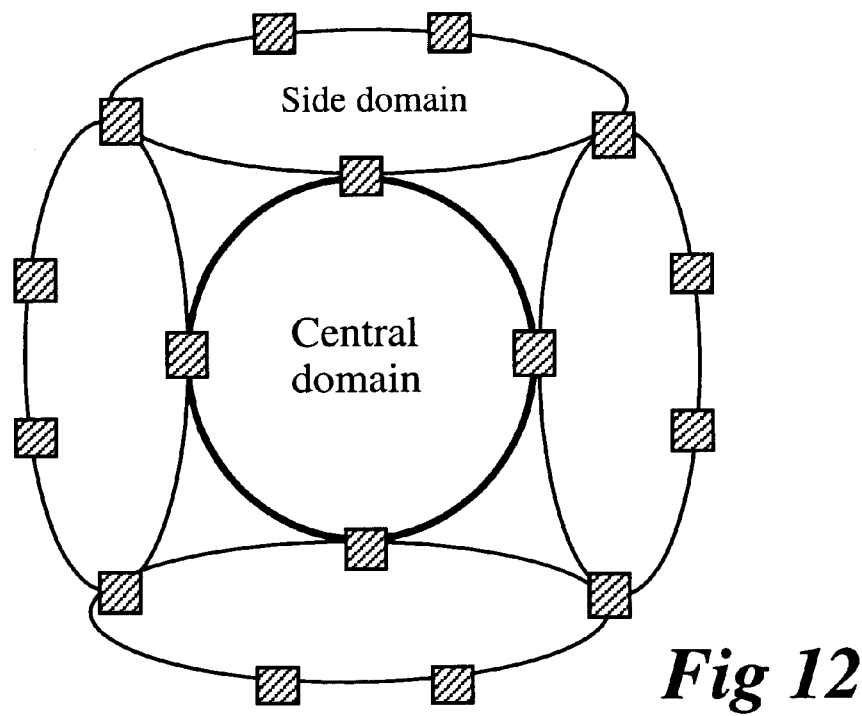
FIG. 12 shows intersecting domains.
Figure 13:
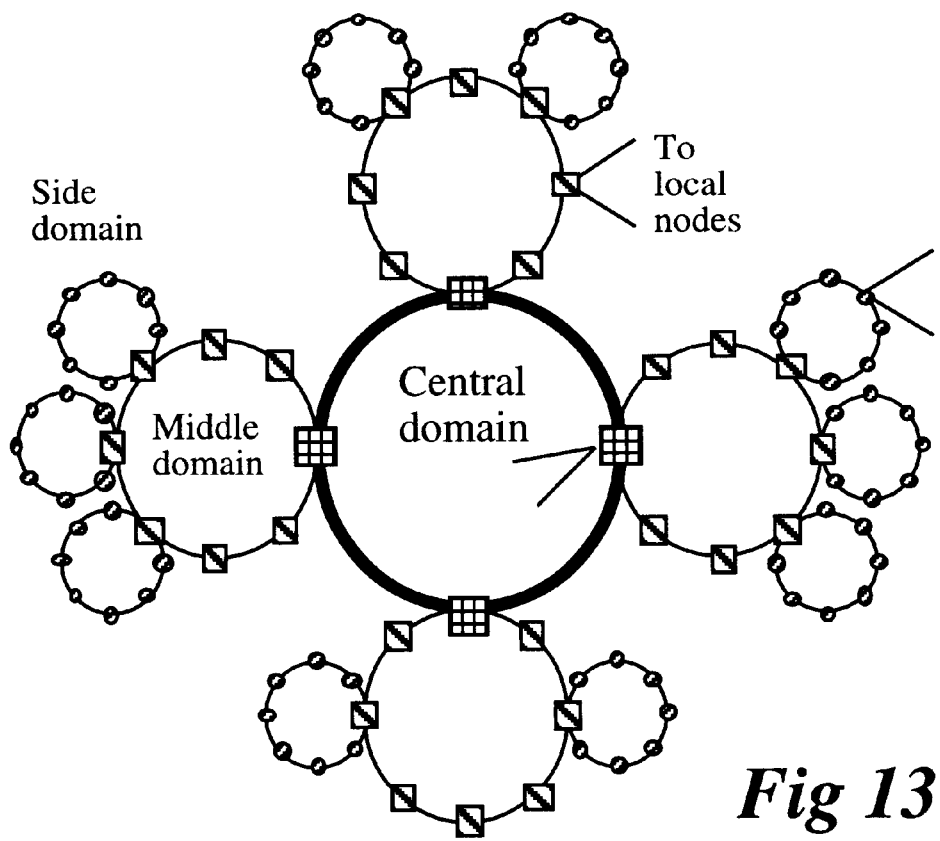
FIG. 13 shows a multi-domain configuration.

The domain definition may be extended to include several parallel single channels, as in FIGS. 12 and 13. Extending the network capacity is realized by increasing the domain capacity, and extending the network coverage is realized by using several intersecting domains. A domain may share common nodes with one or more domains. A node in a given domain sends the traffic to a neighboring domain through one or more common nodes. A domain may also function as a transit medium between two non-adjacent domains. A common node between domain X and domain Y merges the contents of all containers received from the domain X nodes and forms new containers to the domain Y nodes, and vice versa. In this process, there are no surprises: the rate controllers at the network edge ensure that the exchange process leaves no residues, hence no buffering—apart from what is needed for the exchange process—is required. The common nodes, connecting domains, perform the extra task of containers merging.

Figure 14:
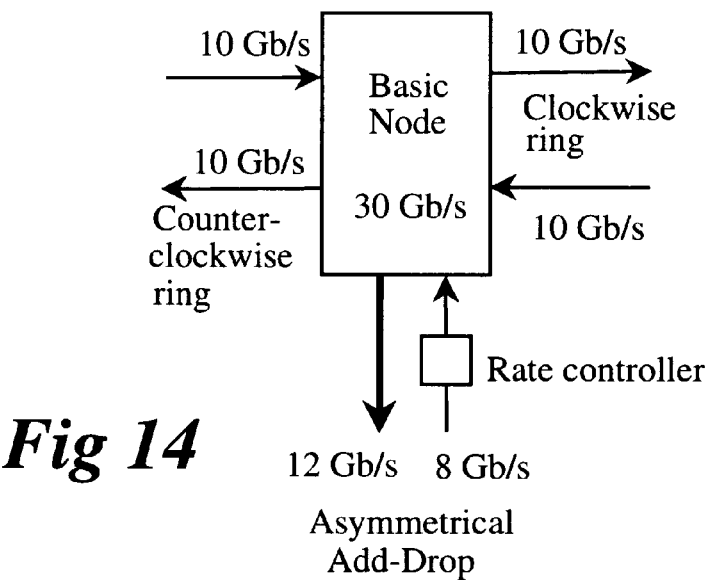
FIG. 14 shows a node construction indicating capacity partitioning (asymmetrical node construction).

A node in FIG. 9 is an add-drop multiplexer and interconnects a dual ring and local subtending edge devices. FIG. 14 depicts one example of the node in which the node has a total input plus output capacity of 60 Gb/s. In a symmetrical node, the input and output sides have 30 Gb/s capacity each. As shown in the Figure, the total capacity may, however, be divided unevenly (asymmetrical node) between input and output in order to accommodate multicast traffic without wasting switch-core capacity, since in multicasting the data is inserted once but may be delivered to several destinations.

As mentioned earlier, a very-high capacity container switch is needed to interconnect the channels in a WDM multi-fiber ring. Large container switches, with capacities ranging from 40 Gb/s to 20 Tb/s may be realizable using multiple WDM links and a rotator-based core architecture.

U.S. Pat. No. 5,745,486 issued on Apr. 28, 1998 to Beshai et al describes the rotator based core architecture. Several alternate realizations are possible. The simplest may be an all-electronic switch core. Other "mostly-optical" solutions may also become economically viable. Multi-dual-channel add-drop modules are advantageous in reducing the route lengths.

Determining the network layout, connectivity, and capacity allocation in a wide-coverage multi-domain network is a challenging task. Optimization procedures are required for planning and provisioning purposes. These procedures are often computationally-intensive, and, fortunately, they need not be performed in real time. On the other hand, fast topological algorithms are needed to respond (in milliseconds) to network-state changes. The topology design is influenced by the path-routing process, and vice-versa. This interdependence offers a good opportunity for network optimization.

Control

In order to explain the main features of the control system, the discussion is limited to a single domain of a single channel. The control may be either frame-based or container-based.

Frame-based Control

Figure 15:
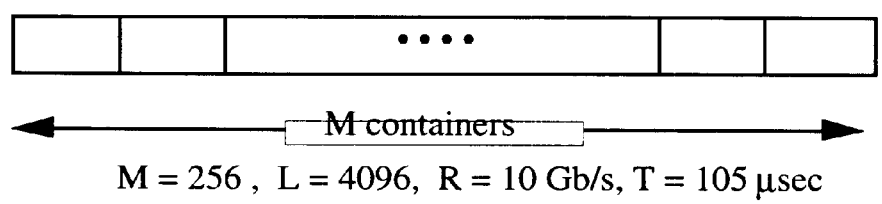
FIG. 15 is a frame construction including M containers.

The process is explained with the help of a numerical example. The container size, in this discussion, is assumed to be fixed at 4096 bits. To realize high-resolution end-to-end capacity allocation with independent successive frames, for example in units of 1 Kb/s, the frame length (the number of containers per frame) may be prohibitively large. However, using a remainder and carry-over process, the frame length can be selected to be only about n (n−1), n being the number of nodes per ring; typically not exceeding 16. It is important to note that an end-to-end capacity of an arbitrary value may be allocated. For example, if a node-pair requires 3.6 Mb/s, it is allocated one container every 10.82 frames, in a 256-container frame, with a channel capacity, R, of 10 Gb/s. The capacity allocation for a node pair is determined as: C=R/S, where S is the number of time slots between successive containers for the node-pair. A single container is carried during a single time slot. Thus, in this example, S=2770, i.e., 10.82 frames. The frame period is T=KL/R, where K is the number of containers per frame and L is the number of bits per container. In an example shown in FIG. 15, K=256, L=4096, R=10 Gb/s, and T=105 msec.

Figure 16:
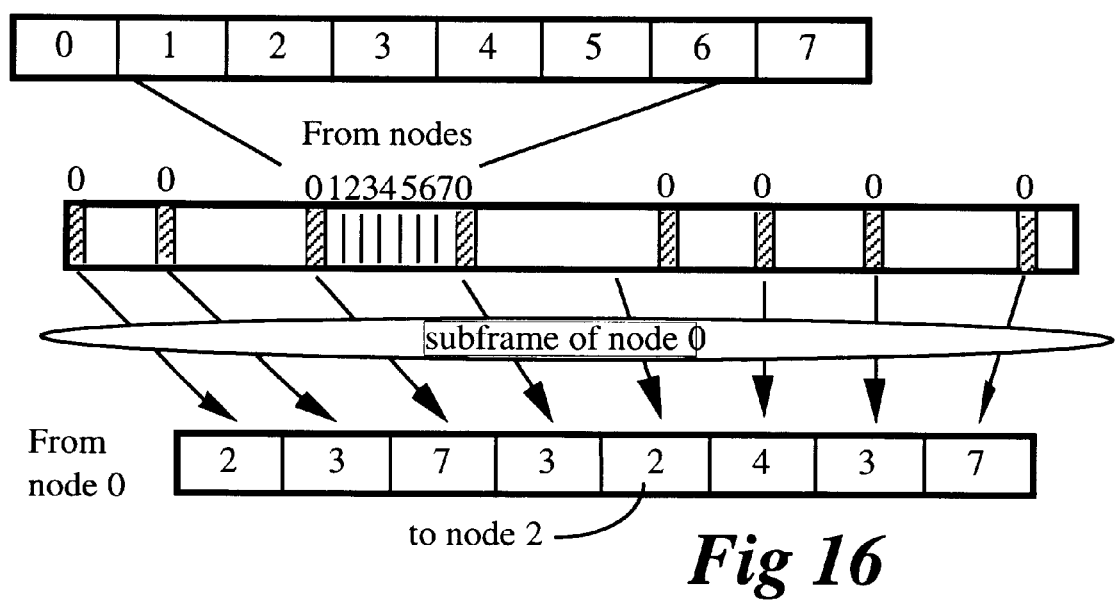
FIG. 16 is a detailed illustration of the data structure according to one embodiment of the invention.

The nodes may be of different capacities. Assuming equal-capacity nodes, each node is assigned the same number of containers which may be distributed unevenly according to destination. The containers from a given node will naturally be separated by containers originating from other nodes. FIG. 16 shows the destinations of containers emanating from node 0; the shaded areas in the figure refer to the time slots granted to originating node 0, i.e., the subframe of node 0. The container allocation may differ between consecutive frames for two possible reasons: change in traffic demand, and/or the allocation of a non-integer number of containers per path per frame, since a non-integer allocation necessitates fraction carry-over between successive frames.

It is noted that the unused time slots in the control frame can be granted to "best-effort" traffic streams, which make no capacity reservation, probably according to a weighted-priority discipline. A frame header identifies each container according to destination. Unassigned containers can be seized without reservation. Several techniques which attempt to maximize the transport efficiency, with predefined fairness, can be used.

Figures 17, 19:
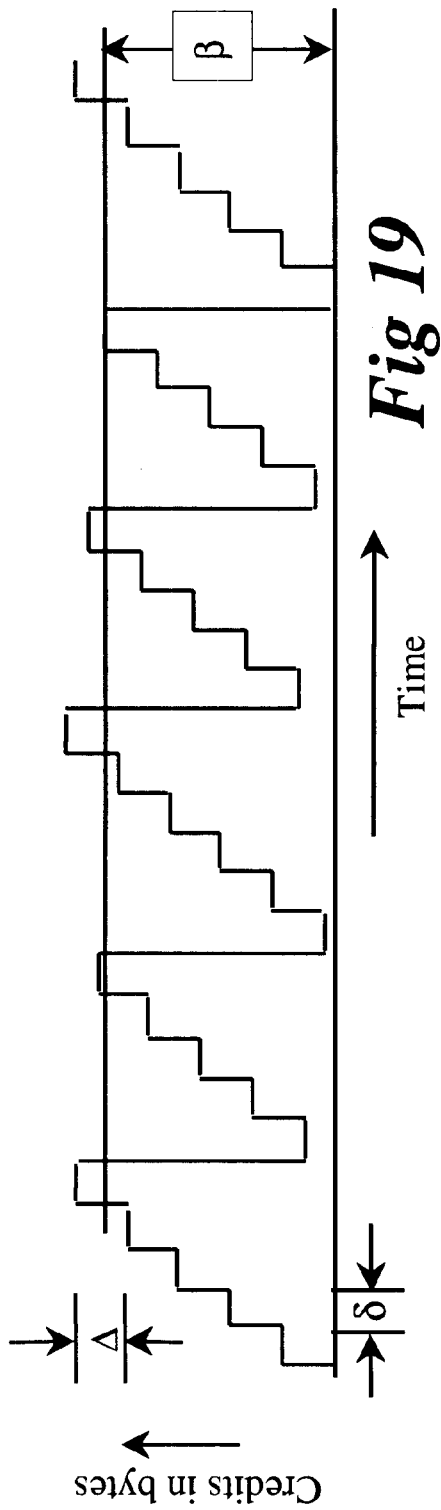
FIG. 17 shows an outgoing container allocation in successive frames.
FIG. 19 is a time scale diagram of the rate control mechanism applied to a class of traffic with fixed-sized containers.

FIG. 17 depicts the change in allocation in a subframe, over a period of four successive frames, to accurately represent non-integer allocations. The containers in this example have a fixed size. Though the allocated containers for a node-pair appear to be contiguous in subframe of FIG. 17, they are in fact well separated in the time domain. The number of containers from node 0 to node 2 during the above four successive frames are 2, 1, 2, and 1, with a mean value of 1.5 containers per frame. Similarly, the allocation for node-pair 0–7 are 2, 3, 2, and 2, with a mean value of 2.25 containers per frame. An arbitrary non-integer number of containers may be allocated for any node-pair.

It is worthwhile to mention that, for low-speed applications, containers of very-small sizes may be used and even byte-interleaving may be appropriate.

Container-based Control

Figure 18:
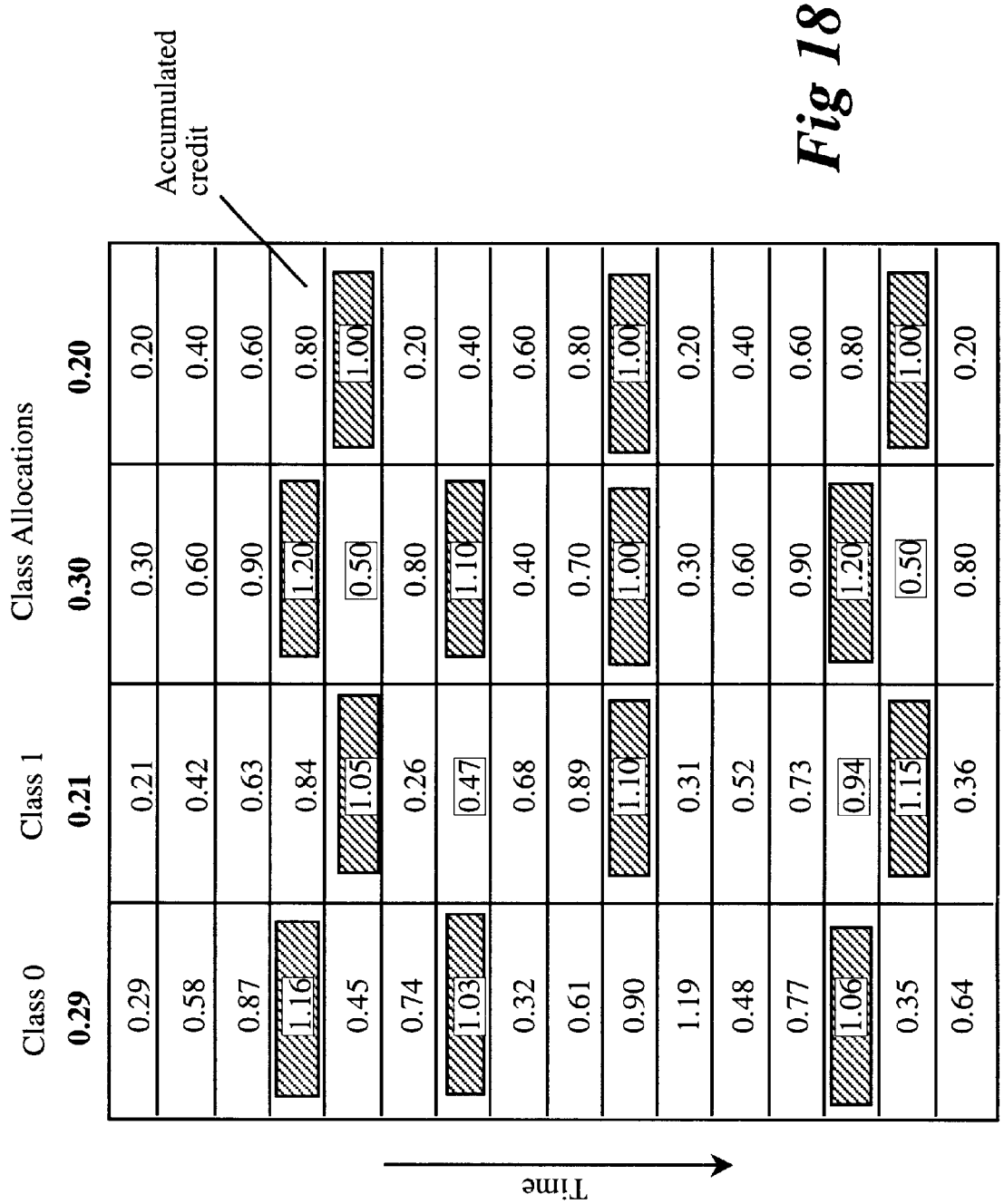
FIG. 18 is a table showing credit accumulation in time for several classes.

In a container-based system, the added load at each node is rate regulated with an allocated service-rate to each destination. Therefore referring back to FIG. 14, rate control module 90 is provided on the add path of the node. The access capacity is shared by a number of traffic streams, identified by destination, which are allocated separate queues at ring access. A stream is identified by its origin and destination and/or class of service. A stream is allocated a direct end-to-end path the capacity of which may vary with time. The streams may share the ring capacity according to one of many policies, such as strict priority, a fixed-rate per stream, or a guaranteed minimum rate per stream. The capacity allocation per stream may be updated individually as the need arises. FIG. 18 shows the division of the stream capacity among four traffic classes according to the normalized capacity allocations 0.29, 0.21, 0.30, and 0.20. The first stream is allocated 0.29 of the link capacity, the second is allocated 0.21 of the channel capacity, and so on. In this example, the containers are assumed to be of a fixed size. In FIG. 19, D represents the normalized capacity allocation for the stream under consideration, d is the duration of the data unit, and b is the container size in data units. During each d, a given stream is credited by its normalized capacity allocation D (in the above example, D is 0.29 for the first stream). An accumulator for each stream keeps track of an accumulated credits. A stream which accumulates a credit of b or more, becomes eligible to transmit a container. The remainder, if the credit exceeds b, is retained by the class. If the credit D is expressed as a fraction of the channel capacity, the value of b is unity. An entry in FIG. 18 indicates the credit available to the corresponding class, and a class is ready for access when its credit is unity or more. A shaded entry corresponds to the time-slot at which the class is entitled to network access. A selector selects a stream among a plurality of eligible streams based on a preset criterion, e.g., round robin. The above description explains the mechanism of rate control.

Path-allocation for a Dual-ring

In the simplest path-allocation form, each stream is allocated a single end-to-end path which may traverse more than one ring. It may be desirable, however, to have two or more paths per stream for reliability as well as even distribution of the traffic intensity across the network. The end-to-end routes may be separated between clockwise and counter-clockwise rings in such a way as to balance the traffic loads on individual inter-nodal links and optimize the overall throughput. Path selection for multiple rings is more elaborate. It should aim at reducing the number of hops traversed from origin to destination, with a view to global optimality.

Container Scheduling

For a lossless network, it is of paramount importance that the data rate per node-pair be time regulated. A domain scheduler performs this function using frequently-updated traffic and topology information. It is important to remember that, due mainly to propagation delay, the traffic input to the scheduling process may differ from the actual traffic waiting at each node at the scheduling time. To compensate for the time-delay, real-time traffic characterization and projection may be applied at each node.

In a single domain, a multicast container is transmitted once and received by several nodes, i.e., the number of received containers exceeds the number of transmitted containers. The scheduling function should attempt to exploit this asymmetry in order to maximize the overall throughput. In a multi-domain network, a multicast container propagates from one domain to neighboring domains through common nodes.

Finally, the connection rate for a stream must be acceptable to the drop link of the receiving node.

As mentioned frequently above, the objective is to control the QOS at the edge since this avoids the complexity of having to deal with it at intermediate nodes. When end-to-end bandwidth demand can not be accommodated for all node-pairs, distinction based on some class or other criteria is required for acceptance of new capacity demands. It is noted that QOS may have several interpretations. The network architecture of the invention allows the QOS to be defined on a node-pair basis.

As described earlier, the capacity of a domain can be extended using multiwavelength multi-fiber interconnected parallel rings. The network's reach is realized by multiple intersecting domains. FIG. 12 illustrates the case of a central domain interconnecting four partially inter-connected side domains.

A network of wide coverage, extending to hundreds of nodes, can be arranged in a multi-level structure as illustrated in FIG. 13. A four-level structure with 10 nodes per domain realizes a network of about 10,000 nodes, each of which may accommodate several subtending nodes. The use of lateral rings interconnecting side domains (not shown in FIGS. 12 and 13) reduces the amount of traffic in the central domain and may also reduce the path length. It is noted that the network rings need not be of equal capacity. When two or more paths are available for a node pair, a given connection must follow the same path in order to maintain container-order.

Figure 20:
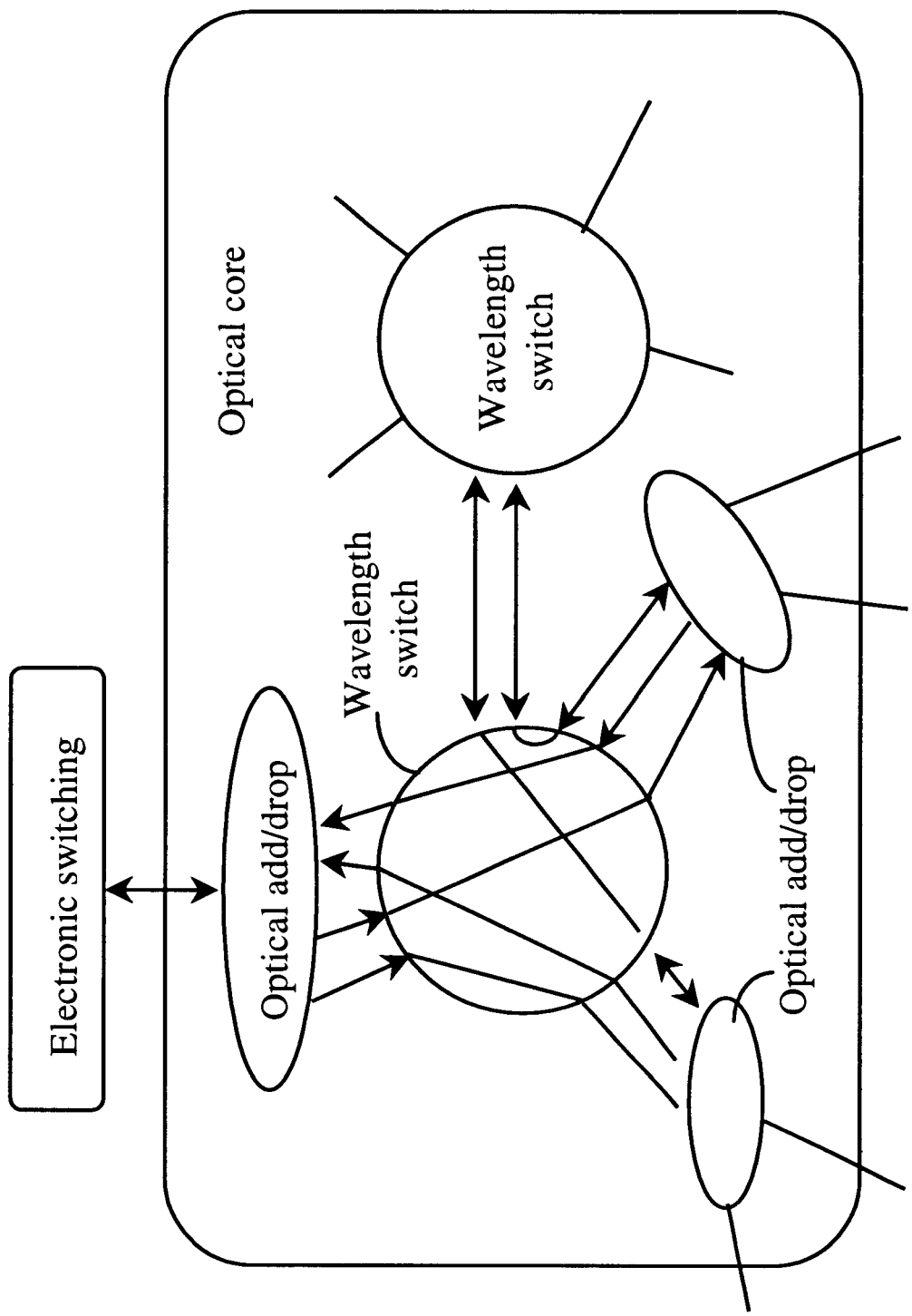
FIG. 20 shows a wavelength cross-section with electronic edge-switching and tandeming.
Figure 21:
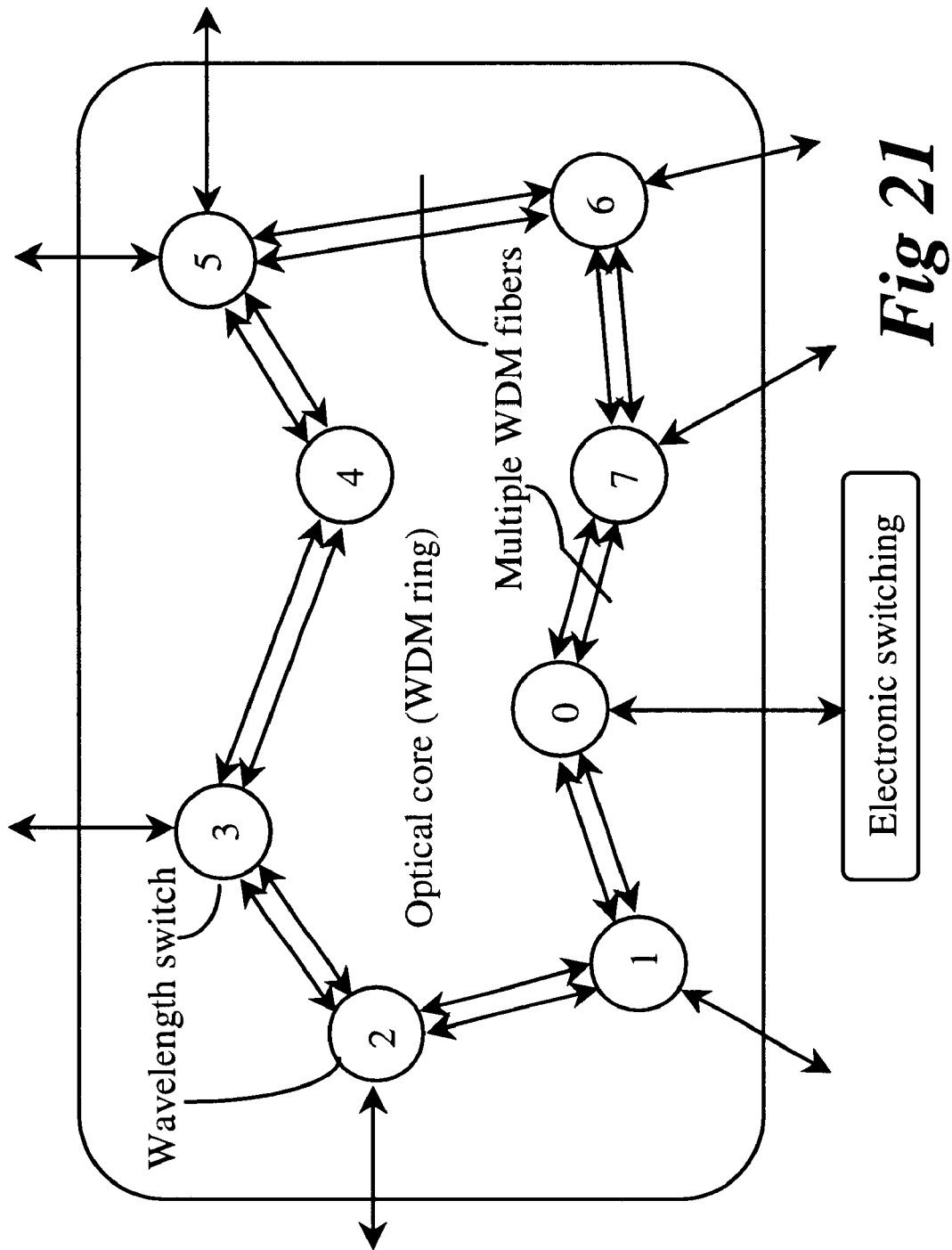
FIG. 21 shows a ring-based wavelength add-drop with electronic edge-swtiching and tandeming.

Unprecedented traffic growth is providing a huge demand for fiber facilities. Not only are the backbone networks outstripping their original design capacities, but the routes will need fiber cable replacements to allow full buildup of high-density WDM. In addition, as the routes grow, there will be further pressures to create better diversity to improve restoration. Currently, WDM is primarily used to increase point-to-point transport capacity. The abundance of transport bandwidth due to WDM may justify a highly-meshed topology at wavelength granularity. However, due to the spatial traffic variation and with wavelength switching, a wide-coverage network may still require tandem switching and capacity-sharing controls, which are now realized electronically. Two dimensional space-WDM switching nodes may be used to realize, at a wavelength granularity, either a partially-interconnected network or a fully-meshed network. FIG. 20 depicts an optical cross-connect configuration, and FIG. 21 depicts a ring configuration, both using space-WDM switching nodes. In either configuration, traffic consolidation and reinsertion at the edges must be done by electronic means to realize arbitrary granularity, i.e., the edges perform the add/drop as well as tandem switching. The path capacity may then be defined in multiples of Kb/s rather than multiples of 2.5 Gb/s (OC48), for example. It is possible with such configurations, using electronic edge switches, to construct a fully-meshed network with fine granularity and realize the benefits of edge control. The control mechanism would differ from that of the ring architecture of FIG. 10.

What we claim as our invention is:

1. A communications network comprising:
   a plurality of dual transport rings each of which transports digital traffic and supports a plurality of nodes, arranged in at least two groups of dual transport rings, and
   a plurality of intersecting nodes, each of which intersects said at least two groups of dual transport rings,
   said digital traffic consisting of containers of digital signal, each destined to at least one of said plurality of nodes, wherein
   each node is operable to extract containers from a dual transport ring and insert thereto containers destined to any of the remaining nodes; and
   each node controls a rate at which it inserts to the dual transport ring containers destined to any of the remaining nodes, and wherein
   each intersecting node packs and unpacks containers from one group to another according to the structures of data streams of each group, and wherein
   each transport ring has a domain controller for collecting topological information about nodes on the dual ring, generating a routing table built using the topological information, and distributing the routing table to the nodes.

2. In a communications network for transporting digital traffic among a plurality of nodes via at least one dual transport ring in a fully meshed logical configuration, the digital traffic consisting of containers of any number of data units, a node comprising:
   two ring buffers for storing traffic in the dual transport ring coming into the node;
   an add buffer for storing containers to be inserted into the dual transport ring according to their destinations and classes:
   a drop buffer for storing containers extracted at the node from the dual transport ring; and
   a rate scheduler for scheduling the insertion of containers into the dual transport ring in accordance with allocated data rates; wherein the containers to be inserted at a node are classified Into at least one class of containers and the rate scheduler comprises;
   a plurality of accumulators, each accumulator used for summing a credit for a class of containers and declaring the class of containers eligible for insertion when the accumulated credit exceeds a predetermined criterion; and
   a selector for choosing one eligible class at a time for insertion to the dual transport ring.

3. The node in a communication network, according to claim 2, wherein the classes are defined according to at least one of the two categories of traffic descriptors and destination and destination of containers.

4. The node in a communications network, according to claim 2, wherein the add buffer has a maximum rate of insertion and the drop butter has a maximum rate of extraction.

5. A method of transporting digital traffic among a plurality of nodes located on at least one dual transport ring in a fully meshed logical configuration, comprising steps of:
   storing a plurality of data streams in a plurality of add buffers according to their destination;
   acquiring an allowed data rate at which each data stream is to be inserted to the dual transporting ring;
   extracting a properly addressed data stream from the dual transporting ring and storing it in a drop buffer; and
   inserting a plurality of data streams into the dual transport ring according to data rates assigned to their destinations;
   wherein each of said data streams comprises a series of containers of data units said containers being categorized according to their destination and classes and the step of storing a plurality of data streams includes a step of;
   storing a plurality of containers in their respective add buffers according to their destinations and classes.

6. The method of transporting digital traffic among a plurality of nodes located on a dual transporting ring according to claim 5, comprising the further step of:
   selecting one data stream at a time among eligible data streams for insertion in accordance with a predetermined criterion.

7. The method of transporting digital traffic among a plurality of nodes located on a dual transport ring according to claim 6, wherein the containers are uniform in size.

8. The method of transporting digital traffic among a plurality of nodes located on a dual transport ring according to claim 5, comprising further steps of:
   acquiring a credit for insertion of packets of each data stream;
   accumulating the credit for each data stream; and
   declaring the data stream eligible for transport when the credit at least equals the allowed data rate.

9. In a telecommunications network formed by a ring transport medium having a plurality of nodes, a method of scheduling digital data at a node, the digital data consisting of a plurality of data streams, comprising steps of:
   storing the plurality of data streams respectively in a plurality of storage locations;
   calculating a parameter indicative of the rate of the data streams stored in each storage location;
   declaring each data stream eligible for transport when the parameter exceeds an allowed data rate of said data stream; and
   transporting into the ring transport medium each eligible data stream in accordance with a predetermined criterion.

10. The method of scheduling digital data at a node according to claim 9, comprising a further step of:
    communicating with a destination node for establishing a connection therewith; and
    setting an allowed data rate to each data stream in cooperation with the destination node.

11. The method of scheduling digital data at a node according to claim 10, comprising a further step of:
    separating digital data into a plurality of data stream in accordance with classes or destination node of the data stream.

12. The method of scheduling digital data at a node according to claim 9, comprising a further step of:
communicating with a domain controller node for traffic allocation; and
setting an allowed data rate to each data stream in cooperation with the domain controller node.

13. The method of scheduling digital data at a node according to claim 12, comprising further steps of:
monitoring a digital traffic propagating in the ring transport medium, the digital traffic containing digital data being transported from each node and;
negotiating at a node with the domain controller node for the allowed data rate for each data stream.

14. The method of scheduling digital data at a node according to claim 9, comprising a further step of:
accumulating a fraction of a total bandwidth which is allocated to each data stream; and
calculating the parameter indicative of the accumulated fraction.

15. In a communications network for transporting digital traffic among a plurality of nodes via at least one dual transport ring in a fully meshed logical configuration, the digital traffic consisting of containers of any number of data units, a node comprising:
two ring buffers for storing traffic in the dual transport ring coming into the if node;
an add buffer for storing containers to be inserted into the dual transport ring according to their destinations and classes;
a drop buffer for storing containers extracted at the node from the dual transport ring; and
a rate scheduler for scheduling the insertion of containers into the dual transport ring in accordance with an allowed data rate.

16. The node in a communications network, according to claim 15,
wherein the classes are defined by categories of traffic descriptors or destination of containers or both.

17. The node in a communications network, according to claim 15,
wherein the allowed date rate is defined by a normalized service rate allocation.

18. The node in a communications network, according to claim 15,
wherein the add buffer has a maximum rate of insertion and the drop buffer has a maximum rate of extraction.

* * * * *